US012804057B2

(12) United States Patent
Alva et al.

(10) Patent No.: US 12,804,057 B2
(45) Date of Patent: Nov. 17, 2026

(54) SYNCHRONIZATION PROTOCOL IN A CLOUD COMPUTING ENVIRONMENT

(71) Applicant: CrowdStrike, Inc., Sunnyvale, CA (US)

(72) Inventors: Neil Alva, Swanscombe (GB); Sorin Otescu, Brasov (RO); Shriram Vishwanathan, Pune (IN)

(73) Assignee: CrowdStrike, Inc., Sunnyvale, CA (US)

( * ) Notice: Subject to any disclaimer, the term of this patent is extended or adjusted under 35 U.S.C. 154(b) by 191 days.

(21) Appl. No.: 18/771,715

(22) Filed: Jul. 12, 2024

(65) Prior Publication Data

US 2026/0019475 A1 Jan. 15, 2026

(51) Int. Cl.
*H04L 69/22* (2022.01)
*H04L 9/40* (2022.01)

(52) U.S. Cl.
CPC .......... *H04L 69/22* (2013.01); *H04L 63/0245* (2013.01); *H04L 63/12* (2013.01); *H04L 63/14* (2013.01); *H04L 63/123* (2013.01); *H04L 63/1408* (2013.01); *H04L 63/1425* (2013.01)

(58) Field of Classification Search
CPC ... H04L 63/0245; H04L 63/12; H04L 63/123; H04L 63/14; H04L 69/22
See application file for complete search history.

(56) References Cited

U.S. PATENT DOCUMENTS

| | | | | |
|---|---|---|---|---|
| 2018/0309725 | A1* | 10/2018 | Dubrovsky | H04L 47/34 |
| 2020/0351244 | A1* | 11/2020 | Moore | H04L 63/0245 |
| 2020/0409977 | A1 | 12/2020 | Yang et al. | |

FOREIGN PATENT DOCUMENTS

| | | |
|---|---|---|
| CN | 101197657 | 6/2008 |
| CN | 108376154 | 8/2018 |
| CN | 110557370 | 12/2019 |
| CN | 115314507 | 11/2022 |
| CN | 116506449 | 7/2023 |
| CN | 116679995 | 9/2023 |

* cited by examiner

*Primary Examiner* — Eric Myers
(74) *Attorney, Agent, or Firm* — Lee & Hayes, P.C.

(57) ABSTRACT

Techniques for exchanging data between a host device and a computing device in a cloud computing environment using a protocol are discussed herein. The protocol can, for example, define a schema for identifying and/or tracking data packets associated with one or more events at the host device. The techniques can include assigning information to the data packets that enable recovery of a data packet and/or arranging the data packets regardless of whether data packets are received out of order. The protocol can improve reliability of data exchanges and perform synchronization in less time and using fewer computational resources (than not implementing the techniques).

20 Claims, 5 Drawing Sheets

SYNCHRONIZATION PROTOCOL IN A CLOUD COMPUTING ENVIRONMENT

BACKGROUND

With computer and Internet use forming an ever greater part of day to day life, security exploits and cyberattacks directed to stealing and destroying computer resources, data, and private information are becoming an increasing problem. Some attacks are carried out using "malware", or malicious software. "Malware" refers to a variety of forms of hostile or intrusive computer programs that, e.g., disrupt computer operations or access sensitive information stored on a computer (e.g., viruses, worms, Trojan horses, ransomware, rootkits, keyloggers, spyware, adware, or rogue security software). Malware is increasingly obfuscated or otherwise disguised in an effort to avoid detection by security software. Determining whether a program is malware or is exhibiting malicious behavior can thus be very time-consuming and resource-intensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
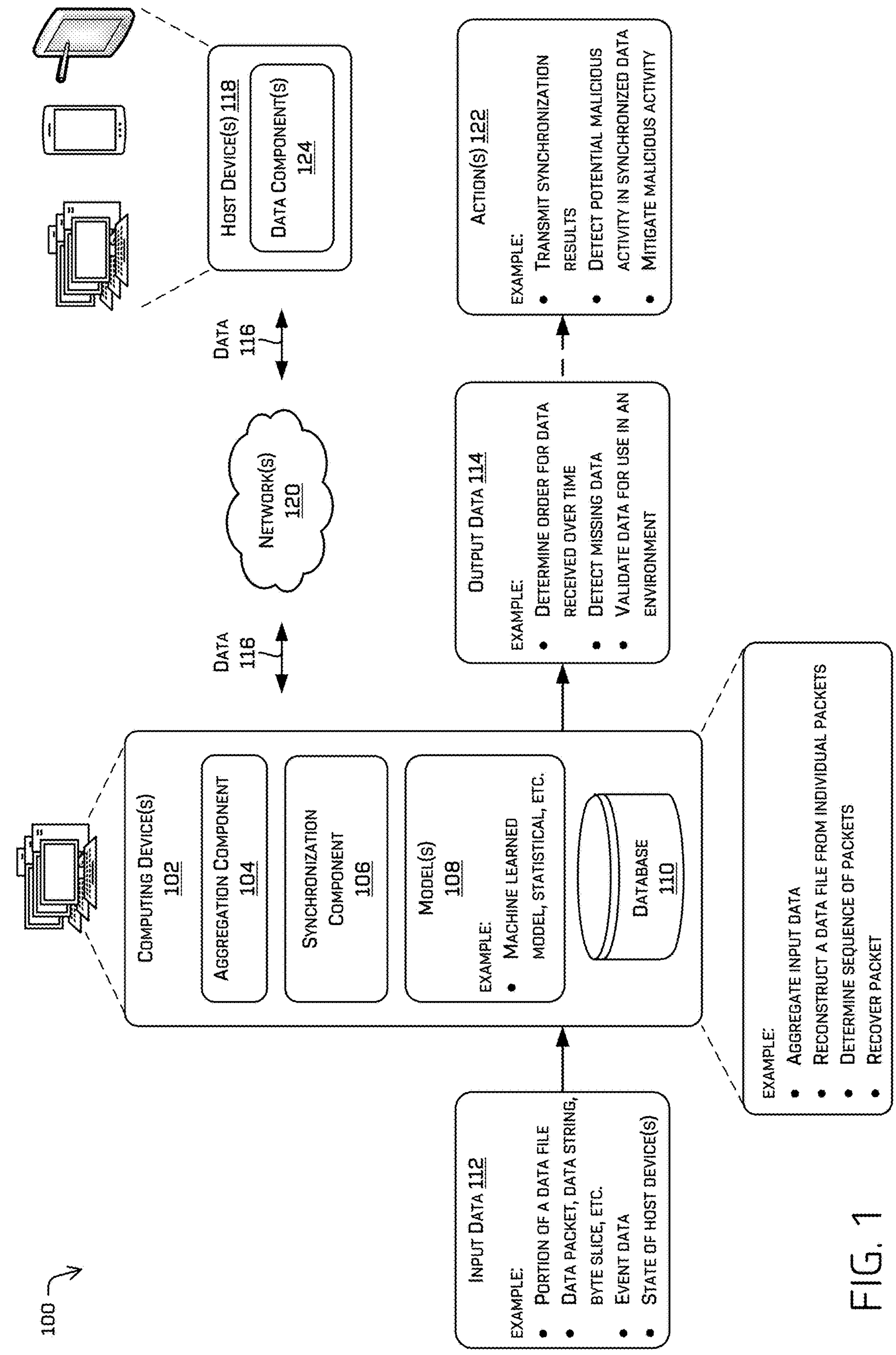
FIG. 1 illustrates an example block diagram of an example computer architecture for synchronizing data using an example protocol, as described herein.

A computer may recognize malware in data by receiving events over a network from a client device and analyzing the events for malicious activity by a threat actor. However, events can be lost, out of order, or otherwise fail to be received by the computer for a variety of reasons thereby causing the computer to fail to accurately analyze all the events for potential malicious activity. In the time it takes for the computer to eventually receive all the events using typical approaches, the malicious activity that had gone undetected remains a security threat to the client device.

This application describes a protocol for exchanging data between a host device and a computing device in a cloud computing environment. The protocol can include a schema for identifying and/or tracking data packets associated with one or more events. The protocol can improve reliability of data exchanges by synchronizing data between the host device and the computing device. The host device can transmit portions of a data file (e.g., data packets, events, etc.) to the computing device using the protocol to enable the computing device to determine a sequence for the portions or to initiate recovery of a portion, for example. By using the protocol as described herein, a data file can be synchronized from a first device to a computing device in a cloud computing environment in less time and with more accuracy (e.g., relative to not using the protocol).

The techniques described herein can include synchronizing data based on descriptions for respective portions of a data file. For example, data from a host device may be sent to a computing device (e.g. a cloud service, a cloud computing device, etc.) configured to receive of determine data indicating a replicated state of activity occurring on the host device over a time period. The computing device can, for example, determine information such as a sequence number, hash value, payload, etc. associated with various portions (e.g., data packet, event, data string, byte slice, byte array, event stream, or the like) of the data. In some examples, the computing device can combine, or "stitch together", the individual portions of data based on the respective information. In some examples, the host device can represent an endpoint and the techniques can be used to transfer, migrate, or otherwise replicate data from the endpoint to a storage device associated with a cloud computing environment.

In various examples, the computing device can detect a difference between the data sent from the host device and the data received by the computing device. The computing device can compare respective information associated with different portions of the data to determine whether a portion is out of order, missing, extraneous, etc. In some examples, the computing device can initiate recovery of a portion to complete synchronization. Additionally or alternatively, the computing device can initiate a request for a particular portion of data to mitigate a dropped data packet, missing data packet, etc.

In some examples, the computing device can validate that the combined data portions are the same as the data stored in a storage device associated with the host device. For instance, the computing device can determine that each of the portions of data received from the host device are in sequence and are otherwise identical to the portions sent from the host device. The computing device can store the sequenced, combined data in a storage device associated with the computing device (e.g., in a cloud computing environment) and/or output the stored data (or portions thereof) for access by a model or component for analysis such as to detect presence of malicious activity associated with the data received from the host device.

By way of example and not limitation, a host device can prepare a JavaScript object notation (JSON) file for sending to a cloud service (e.g., a data synchronization service, a security service, etc.) The host device can, for example, determine portions, data packets, events or the like, for representing the JSON file. The host device can also or instead determine a hash value for the data file, a sequence number, an index number, a payload, etc. for associating with each data packet sent to the cloud service. The techniques described herein can include the cloud service managing the transfer of data associated with the JSON file from the host device to a storage device associated with the cloud service.

In various examples, the techniques described herein can include the host device serializing the JSON file into a payload, transmitting the payload as separate data packets, combining the data packets to replicate the payload, and deserialize the payload for use in a cloud computing environment (e.g., generate deserialized data). In various examples, the information, identifiers, hash values, etc. enable analysis of the data packets to determine whether the JSON file that is deserialized is functionally equal to the JSON file that was serialized for sending by the host device.

The schema can represent an architecture for exchanging data between two devices or components. For example, the schema can include defining portions of data, determining information describing the portions of data, and performing various actions or operations based on the determined information. The schema can represent a data structure for storing the data in a database and/or for executing the data by a processor. The schema can implement a synchronization protocol to format the information associated with various portions of data for transmission. The synchronization protocol can include a set of rules, policies, or the like, for communicating data over one or more networks, for example. In some examples, the protocol can provide a communication channel for sending or receiving data defined by the schema.

The information (or schema) described herein can enable a variety of operations including, for example, determining information for a data packet including a unique identifier for each data packet, a sequence of a data packet relative to another data packet, a binary payload, an identifier of the host device, among others. In some examples, the schema can be used to cause the host device to send identifiable portions of data for reconstruction by a computing device in another environment. The schema may also or instead be used to detect an order for the data packets, a number of data packets associated with a particular JSON file, and/or a sequence for the data packets. In some examples, the schema may be used to request a data packet that was not received by the computing device such as due to a network failure. Details for preparing a JSON file (or other input data) for sending to another device are discussed throughout this disclosure.

In various instances, a computing device may install, and subsequently execute, a security agent as part of a security service system to monitor and record events and/or patterns on a plurality of computing devices (e.g., a host device, a client device, etc.) in an effort to detect, prevent, and mitigate damage from malware or malicious attack. In various examples, the security agent may detect, record, and/or analyze events on the computing device, and the security agent can send those recorded events (or data associated with the events) to a security system implemented in the "Cloud" (the "security system" also being referred to herein as a "security service system," a "remote security service," or a "security service cloud"). At the security system, the received events data can be further analyzed for purposes of detecting, preventing, and/or defeating malware and attacks. The security agent can, for instance, reside on the host device, observe and analyze events that occur on the host device, and interact with a security system to enable a detection loop that is aimed at defeating all aspects of a possible attack.

Some examples herein may relate to detecting activity from a threat actor accessing, or attempting to access, data associated with a host device, such as using a protocol for transmitting the data from the host device to a security service for analysis. For brevity and ease of understanding, as used herein, "suspicious" refers to events or behavior determined using techniques described herein as being possibly indicative of attacks or malicious activity. The term "suspicious" does not imply or require that any moral, ethical, or legal judgment be brought to bear in determining suspicious events.

In various examples, a system comprising a synchronization component can determine information to associate with data packets, events, or the like. For example, the system can determine information for portions or data packets representing a data file, a data string, byte slice, byte array, or data stream, just to name a few. By analyzing the information output by the system as described herein, a same or different system can determine presence of potential security threats (e.g., an unauthorized process, thread, executable, or other activity) in the input data and/or in subsequent data received at a later time.

In some examples, the system can automatically and proactively determine and/or identify information for various data packets independent of user input and/or a need to maintain a particular communication channel. Data packets can be sent over a network using various techniques, and be combined into a sequence that matches the initial sequence of data packets sent from the host device. In some examples, the system can provide functionality to cause a host device to improve analysis of data strings by the host device (e.g., to detect malicious activity by synchronizing data more efficiently).

In various examples, first data for sending from the host device and/or second data received by the computing device may be stored in a storage device for a period of time to enable access to missing data packets, for example. The stored information can be updated, deleted, added, or otherwise managed over time to maintain a list of data packets and associated information that can be provided to the various devices periodically and/or upon request. Additional description for determining metadata, or similar information, can be found throughout this disclosure including in the figures below.

Outputting the information by the system enables improved detection, remediation, and analysis of portions that represent a data file (versus not implementing the system). In various examples, the system can be implemented as a cloud-based service configured to synchronize data for storage and further analysis such as to improve subsequent detection of malicious events (e.g., by improving how portions are identified, combined, etc.).

In various examples, the system can receive, as input data, a portion of the data stream from a storage device (or receive the portion in real-time independent of the database), such as a data stream database that receives (and in some instances replicates) all data associated with the data stream. By using the techniques described herein, data usable for protecting the host device and/or the data stream can be identified in less time and with more accuracy (e.g., versus relying on a human to analyze and convey the analyzed data to a user of the host device).

The system can employ a variety of different models to perform the techniques described herein. As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques can be used to reduce computational resources required to determine that data received from a device has been replicated or otherwise received in a cloud computing environment. For example, the techniques can perform synchronization using fewer memory and/or processor resources by using a schema that enables comparison of data packets more efficiently. The schema can be used to speed up recovery of dropped packets or otherwise improve an amount of time required to arrange received data packets as replicated data.

The techniques described herein can improve the quality of data transmitted to synchronize data by reducing an amount of data transmitted over a network in association with a data synchronization. For instance, the techniques can improve network efficiency (e.g., save network bandwidth, free up memory and/or processor resources, etc.) by tracking data packets more effectively thereby requiring fewer requests for missing data or to rearrange data in a correct sequence.

The techniques described herein can also or instead improve functioning of a computing device by providing a scalable and efficient method for synchronizing data.

Although in some examples the system comprises a computing device and a host device, in other examples, the system may enable the techniques described herein to be performed by the host device independent of the computing device and/or independent of a network connection. That is, either the host device and/or the computing device may implement one or more components and/or models to generate data packet information usable to replicate data, and to analyze the replicated data to prevent potential malicious activity at the host device. In various examples, the data packet information can be generated independent of requiring a network connection, and can be optionally stored in a storage device for a threshold period of time (e.g., to retrieve missing data).

As used herein, the term "adversaries" or "threat actor" includes, e.g., malware developers, exploit developers, builders and operators of an attack infrastructure, those conducting target reconnaissance, those executing the operation, those performing data exfiltration, and/or those maintaining persistence in the network, etc. Thus the "adversaries" can include numerous people that are all part of an "adversary" group.

Some examples relate to receiving or processing a data string, byte slice, byte array, event stream, data sequence, or the like, indicating activities of system components such as processes or threads. Many system components, including malicious system components, perform a particular group of operations repeatedly. For example, a file-copy program repeatedly reads data from a source and writes data to a destination. In another example, a ransomware program repeatedly encrypts a file and deletes the un-encrypted original. Some examples relate to detecting such repetitions. Some examples locate repeated groups of operations based on the determined schema, permitting malware detection without requiring disassembly or other inspection of the code for that malware. Of course, the techniques can also be used to detect single, non-repetitive, instances that may occur in input data.

The techniques described herein may be implemented in a number of ways. Example implementations are provided below with reference to the following figures. Although discussed in the context of a security system, the methods, apparatuses, techniques, and systems, described herein can be applied to a variety of systems (e.g., data storage systems, service hosting systems, cloud systems, and the like), and are not limited to security systems.

FIG. 1 illustrates an example block diagram 100 of an example computer architecture for synchronizing data using an example protocol, as described herein. The diagram 100 includes one or more computing device(s) 102 associated with a service system such a security provider. In various examples, the service system may be part of, or associated with, a cloud-based service network that is configured to implement aspects of the functionality described herein.

As shown in FIG. 1, the computing device(s) 102 comprising an aggregation component 104, a synchronization component 106, one or more models 108, and a database 110 to perform the functionality described herein. For instance, the computing device(s) 102 can implement one or more components and/or one or more models to receive input data 112 such as a portion of a data file and determine output data 114 indicating a reconstruction of the data file.

In various examples, the computing device(s) 102 can exchange data 116 with one or more host device(s) 118 over one or more network(s) 120. The data 116 can represent data for synchronizing from the host device(s) 118, a request from the computing device(s) 102, confirmation that the data file has been stored in the database 110, etc., Depending on examples, the data 116 may be received from a variety of data sources. For instance, the host device(s) 118 can transmit data packets representing the data file as the data 116 at a first time to the computing device(s) 102 to cause the generation of the output data 114.

In various examples, the aggregation component 104 may aggregate, identify, retrieve, access, or otherwise determine input data 112 which may include an event(s), a data packet(s), a data string(s), a data sequence(s), or the like, for a model or component of the computing device(s) 102 to process. In various examples, the aggregation component 104 may receive the input data 112 from a data stream, a host device, a memory, and/or a storage device (e.g., associated with the service system and/or associated with the host device(s) 118).

The synchronization component 106 represents functionality to synchronize the input data 112 for storage in the database 110 and/or for generating the output data 114. For example, the synchronization component 106 can replicate, reproduce, reconstruct or otherwise duplicate the input data 112 as a sequential set of portions based on specific information associated with the portions. The synchronization component 106 to determine an order for the portions regardless of whether the portions are received at different times. The portion of the input data 112 can represent a data packet, an event, a data string, a byte slice, a byte array, an event stream, or the like.

Additionally, or alternatively, the synchronization component 106 may detect that data required for replicating the input data is missing, not been received, corrupted, or otherwise not available. In some examples, the synchronization component 106 may retrieve the missing data required to replicate a data file in less time and with fewer data exchanges (relative to not implementing the synchronization component 106). For instance, a portion can represent a data packet, and the host device(s) 118 can generate information to associate with each data packet for sending which may describe a position of the data packet relative to another data packet, an index number, a payload, a hash of a file, among others. In various examples, the information can include human-readable data and/or computer-readable data. Functionality associated with the synchronization component 106 is discussed throughout his disclosure including in FIGS. 2 and 3 below.

As described herein, the model(s) 108 may be representative of machine learned models, statistical models, heuristic models, or a combination thereof. For instance, the computing device(s) 102 can implement the model(s) 108 to determine a sequence of data packets received as the input data 112 (e.g., at particular time or over a time period), detect data missing from a sequence of data packets, reconstruct a data file associated with the host device(s) 118, just to name a few.

The database 110 can represent a storage device for storing some or all of the input data 112 and/or the output data 114, and may be accessible by a device and/or service to perform the techniques described herein. In some examples, the database 110 can store data values representing information associated with the portions of data received as the input data 112, synchronized data, etc.

The input data 112 can vary depending on examples and can represent a portion of a data file (e.g., a data packet of a JSON file), event data associated with one or more events occurring at the host device(s) 118, or a state of the host device(s) 118 (e.g., a current hash value, index value, sequence number, etc.). In some examples, the input data 112 can include a request to synchronize an application, workload, data file, etc. and can include data of varying size, data formatting type, and so on.

In examples after initial data is received by the computing device(s) 102 for processing (e.g., after a first portion is sent for synchronizing), the input data 112 can include a state of the host device(s) 118 at a particular time, such as a recently transmitted sequence number, hash value, etc. The state of the host device(s) 118 can be compared to information associated with a recently received data packet by the computing device(s) 102. The synchronization component 106 can determine whether any portions are missing based on whether the hash value or sequence number of a current state matches a corresponding hash value or sequence number of the recently received data packet.

The output data 114 can represent a sequential order of data portions, a determination of a missing portion of data, and/or validation that the combined portions represent the stored data at the host device(s) 118 and can be analyzed for potential malicious activity, just to name a few. In some examples, the output data 114 can represent a classification (e.g., Are all the indexes received? “yes” or “no”). The output data 114 can be used to determine one or more actions 122 such as transmitting synchronization results to the host device(s) 118 as part of the data 116 at a second time, storing the output data in the database 110, detecting (by a security service) potential malicious activity in the output data 114 (e.g., in the synchronized data). The actions(s) 122 may also or instead include modifying a parameter of a network, device, or component to reduce or eliminate an impact of the potential malicious activity.

The host device(s) 118 may implement one or more data components 124 which is stored in memory of the host device(s) 118 and executable by one or more processors of the host device(s) 118. The host device(s) 118 may be or include any suitable type of device, including, without limitation, a mainframe, a work station, a personal computer (PC), a laptop computer, a tablet computer, a personal digital assistant (PDA), a cellular phone, a media center, an embedded system, a robotic device, a wearable device (e.g., sunglasses, clothing, etc.), a vehicle, a Machine to Machine device (M2M), an unmanned aerial vehicle (UAV), an Internet of Things (IoT), or any other type of device or devices capable of communicating via an instance of the data component(s) 124. An entity may be associated with the host device(s) 118, and the entity (user, computing device, organization, or the like) may have registered for security services provided by a service provider of the computing device(s) 102.

In some embodiments, the network(s) 120 may include any one or more networks, such as wired networks, wireless networks, and combinations of wired and wireless networks. Further, the network(s) 120 may include any one or combination of multiple different types of public or private networks (e.g., cable networks, the Internet, wireless networks, etc.). In some instances, the host device(s) 118 and the computing device(s) 102 communicate over the network(s) 120 using a secure protocol (e.g., https) and/or any other protocol or set of protocols, such as the transmission control protocol/Internet protocol (TCP/IP).

The data component(s) 124 can represent software, firmware, hardware, or a combination thereof, that is configured to exchange data with the computing device(s) 102, and the components thereof. In some examples, the data component(s) 124 can be configured to send or receive data associated with a security concept to and/or from the computing device(s) 102. The data component(s) 124 may provide functionality for the host device 118 to interface with the computing device(s) 102 to manage a security concept, request security recommendations, and/or receive field description data as described herein.

The data component(s) 124 may, in some examples, be kernel-level security agents, or similar security application or interface to implement at least some of the techniques described herein. Such kernel-level security agents may each include activity pattern consumers that receive notifications of events in a query that meet query criteria. The kernel-level security agents may each be installed by and configurable by computing device(s) 102, receiving, and applying while live, reconfigurations of agent module(s) and/or an agent situational model. Further, the kernel-level security agents may each output query results to the computing device(s) 102 that include the security-relevant information determined by the data component(s) 124. The data component(s) 124 may continue to execute on the host device(s) 118 by observing and sending detected activity to the computing device(s) 102 while the host device(s) 118 is powered on and running.

In some embodiments, the data component(s) 124 may be connected to the computing device(s) 102 via a secure channel, such as a virtual private network (VPN) tunnel or other sort of secure channel and may provide query results security-relevant information to the computing device(s) 102 through the secure channel. The data component(s) 124 may also receive configuration updates, instructions, remediation, etc. from the computing device(s) 102 via the secure channel.

Though depicted in FIG. 1 as separate components of the computing device(s) 102, functionality associated with the aggregation component 104, the synchronization component 106, and/or the model(s) 108 can be included in a different component of the service system, a single component, or be included in the host device(s) 118. In some instances, the components described herein may comprise a pluggable component, such as a virtual machine, a container, a serverless function, etc., that is capable of being implemented in a service provider and/or in conjunction with any Application Program Interface (API) gateway.

Figure 2:
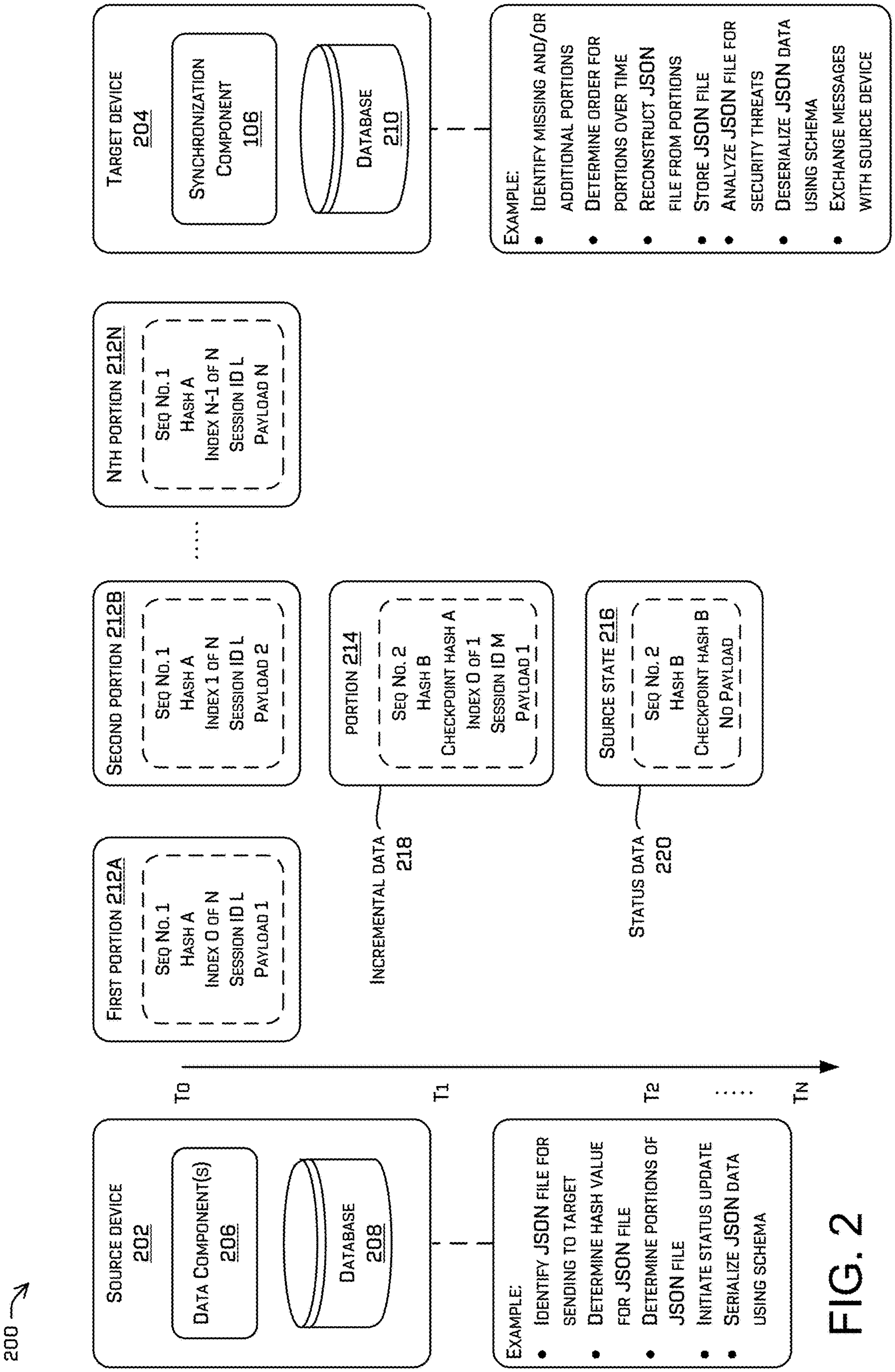
FIG. 2 illustrates a diagram of an example computing device implementing an example synchronization component to perform the techniques described herein.

FIG. 2 illustrates a diagram 200 of an example computing device implementing an example synchronization component to perform the techniques described herein. For example, a source device 202 can exchange data with a target device 204 that includes the synchronization component 106 of FIG. 1. The target device 204 can receive portions of data from the source device 202 and determine an order for the portions over time based on information associated with the received portions.

The source device 202 can represent a computing device that sends data for synchronization to the synchronization component 106 and can represent the host device(s) 118 of FIG. 1. In some examples, the source device 202 can represent a mainframe computer in a mainframe computing environment while in other examples, the source device 202 may represent a cloud computing device located in a cloud computing environment. The source device 202 can include data component(s) 206 which may be configured similar to the data component(s) 124, and a database 208. The data component(s) 206 can represent a security agent, sensor device, etc. for configuring data for sending to the target device 204. In some examples, at least some functionality associated with the synchronization component 106 can be included in the data component 206 to cause the source device 202 to generate information to append to or associate with portions of data for sending.

The target device 204 can represent a computing device that receives the data for synchronization from the source device 202 and can represent the computing device(s) 102 of FIG. 1 (and may further include the aggregation component 104 and/or the model(s) 108). The target device 204 can further include a database 210 for storing at least some of the data to be synchronized and/or synchronized data, depending on examples.

In some examples, the source device 202 can send a first portion 212A, a second portion 212B, . . . , up to an Nth portion 212N where N is an integer greater than 1 (also referred to as "the portions 212") to the target device 204. The portions 212 can be sent at approximately a same time or be sent at different times over a time period. FIG. 2 denotes time T0 for sending the portions 212, though as mentioned the transmitting of each of the portions 212 can be sent at a periodic interval and/or a random interval. The portions 212 can, for instance, represent data packets associated with a data file, such as a JavaScript Object Notation (JSON) file. In various examples, the portions 212 can represent a set of data packets, events, or the like sent as initial data for synchronization. At time $T_1$, the source device 202 can transmit a portion 214 representing incremental data 218 (e.g., data received after the initial data). At time $T_2$, the source device 202 can transmit a source state 216 representing status data 220 indicating information about a most recently transmitted portion. The status data 220 can indicate, for example, one or more of: a sequence number, a hash value (e.g., of a data file), a checkpoint hash value (e.g., included in the incremental data 218 and/or in status data 220), and/or payload information (e.g., "payload value" or "no payload"). Though shown at time $T_2$ in FIG. 2, the source state 216 can be sent at anytime and can vary in frequency to provide the target device 204 with information usable for synchronizing data to the database 210.

By way of example and not limitation, the source device 202 can identify a JSON file for sending to the target device 204 and determine a hash value for the JSON file. For example, the source device can apply a hash algorithm to the JSON file to generate a hash value to represent the JSON file. The source device 202 can also or instead determine portions of the JSON file (e.g., the portions 212, the portion 214, etc.) based on a size criteria or other criteria. To determine the portions 212, the source device 202 can serialize JSON data of the JSON file using a schema to pre-process the data file for transmission.

The source device 202 can determine information to assign or associate with a determined portion, such as a sequence number, a hash value, an index number, a total number of indexes associated with a sequence, a source device identifier, and a payload, though other information may also or instead be determined. For example, the first portion 212A can include information comprising a sequence number and/or hash value for identifying an origin of a respective portion. The index number and total number of indexes can be used to arrange or combine the portions 212 relative to one another, for example. The target device 204 can receive portions from a variety of different source devices and the source device identifier can be used to identify which portions belong to the different source devices. In some examples, the source device identifier can be included in a particular portion (e.g., the portions 212, the portion 214, the source state 216, etc.).

In various examples, one or more of the portions 212 and/or the portion 214 can include a session identifier to identify a session of portions. For example, the first portion 214A, the second portion 214B up to the Nth portion 212N include a session identifier "L" to indicate that the respective portions are part of a same session of data for processing from a host device. The session identifier can be used, for instance, to identify and/or to retrieve a dropped or missing portion.

The target device 204 can implement the synchronization component 106 to analyze the information associated with the portions 212, the portion 214, the source state 216, and/or other data received as input. For example, the incremental data 218 can include another portion(s) in addition to the portion 214, a missing portion, etc. In some examples, any number of additional incremental data and/or source states can be received over time until all the portions associated with the JSON data file are received by the target device 204.

The target device 204 can compare information of respective portions to identify missing and/or additional portions for a given time or over a time period. For instance, the synchronization component 106 can determine that an incremental data at time $T_3$ is associated with a missing portion, duplicate portion, or additional portion based on a difference between the index numbers received and the total number of indexes.

In examples when a missing portion, corrupted portion, or the like is detected, the target device 204 can generate a request identifier to associate with a message for sending to the source device requesting the missing portion. For example, the target device 204 can identify a sequence number, a hash value, an index number, a session identifier, and/or a source identifier associated with the missing portion, and request the particular portions required to generate the JSON file. By way of example and not limitation, the target device 204 can generate a request for specific portions usable to replay and/or or reconstruct a session of portions by including the session identifier and index values in the request.

As shown in FIG. 2, the portions 212 can include a same sequence number or hash value for combining the portions 212 with subsequently received portion such as the portion 214. For example, the portion 214 denotes a sequence number two to indicate a sequence of the portions 212 relative to the portion 214. Each of the portions 212 include a payload representing formatted data of a particular size (e.g., 64 KB) and format (e.g., serialized for sending as a payload).

The source state 216 can represent a current state of the source device 202 such as a last hash value, an indicator of "no" payload, etc. sent by the source device 202. In examples when a network issue causes a portion of data to be lost before receipt by the target device 204, the source state 216 can be used to determine that the source device 202 sent a sequence number 2 of hash B. For example, the target device 204 can determine that the portion 214 received prior to the source state 216 also includes the sequence number 2 and hash B and therefore no action is needed. However, if the sequence number or hash value of the source state 216 differs from the sequence number or hash value of most recently received data by the target device 204, then the target device 204 can initiate recovery of at least a portion. In some examples, the incremental data 218 associated with the portion 214 can include a hash value that is different from the hash value of another portion received at a different time, and the target device 204 can initiate recovery of some or all of the portions of a session.

The source state 216 can also serve as an indicator for whether or not the source device 202, or associated with network(s) for exchanging the data, are functioning as expected or alternatively are experiencing an interruption. In various examples, the status data 220 of the source state 216 can indicate a sequence number, a hash value of a data file, and/or a checkpoint hash value. The status data 220 can represent a state of a data exchange and does not require or include a payload of the data file. The checkpoint hash value can, for instance, represent a data file that is being processed by the target device 204 at a particular time.

In various examples, the incremental data 218 can represent a change to a data file over time, and can be transmitted from the source device 202 to the target device 204 at various times. In examples when the data file is a JSON file, the source device 202 can generate the incremental data 218 to represent differences is data stored in the database 210 and the database 208 at a particular time. For example, the incremental data 218 can represent portions of the JSON data file that change over time (e.g., a state of the stored information changes from a first state to a second state) rather than portions of the JSON data file that do not change over time (e.g., a state of the stored information in unchanged). In some examples, the incremental data 218 can represent changes to the JSON data file over time, such as an update to a JSON data object or value. By using the incremental data 218 at one or more times, changes to relatively large JSON data files can be captured incrementally without requiring computational resources to send or receive data that remains unchanged for a particular time period.

In some examples, an increment update to data (e.g., the incremental data 218) can represent an update while synchronizing a JSON document from a source device (e.g., an endpoint device) to a cloud computing environment. The incremental update can, for example, represent a data packet that includes a sequence number (e.g., for processing multiple data packets in sequence, etc.), a checkpoint hash value (e.g., a first hash value) and a current hash value (e.g., a second hash value), though other information may also be included. In various examples, the computing device(s) 102 can, prior to performing an update the checkpoint hash value, compare, validate, or verify in view of a checkpoint hash value at a target device (e.g., a current checkpoint at a cloud computing device).

The target device 204 can reconstruct or otherwise generate the JSON file from the portions received at one or more times. For example, the synchronization component 106 can arrange the portions 212, the portion 214, and optionally additional portions in an order corresponding to an order of the portions transmitted from the source device 202. In this way, payloads corresponding to different portions can be arranged the synchronization component 106 to reproduce the JSON file for storage in the database 210 and/or for output to another model or component.

In some examples, a security service can analyze the JSON file to detect potential security threats in the JSON file. In various examples, a target device 204 can transmit indications of potential malicious activity to the source device 202 and initiate one or more actions (e.g., the action(s) 122) to mitigate the potential security threat (e.g., run a test to verify the potential security threat, quarantine data, remove data from a database, or the like). In some examples, the security service can analyze the JSON file and determine that the JSON file does not include a potential security threat, and cause the target device 204 to configure a message indicating that the portions or data packets associated with the data file are valid for execution by a processor of the source device 202.

Figure 3:
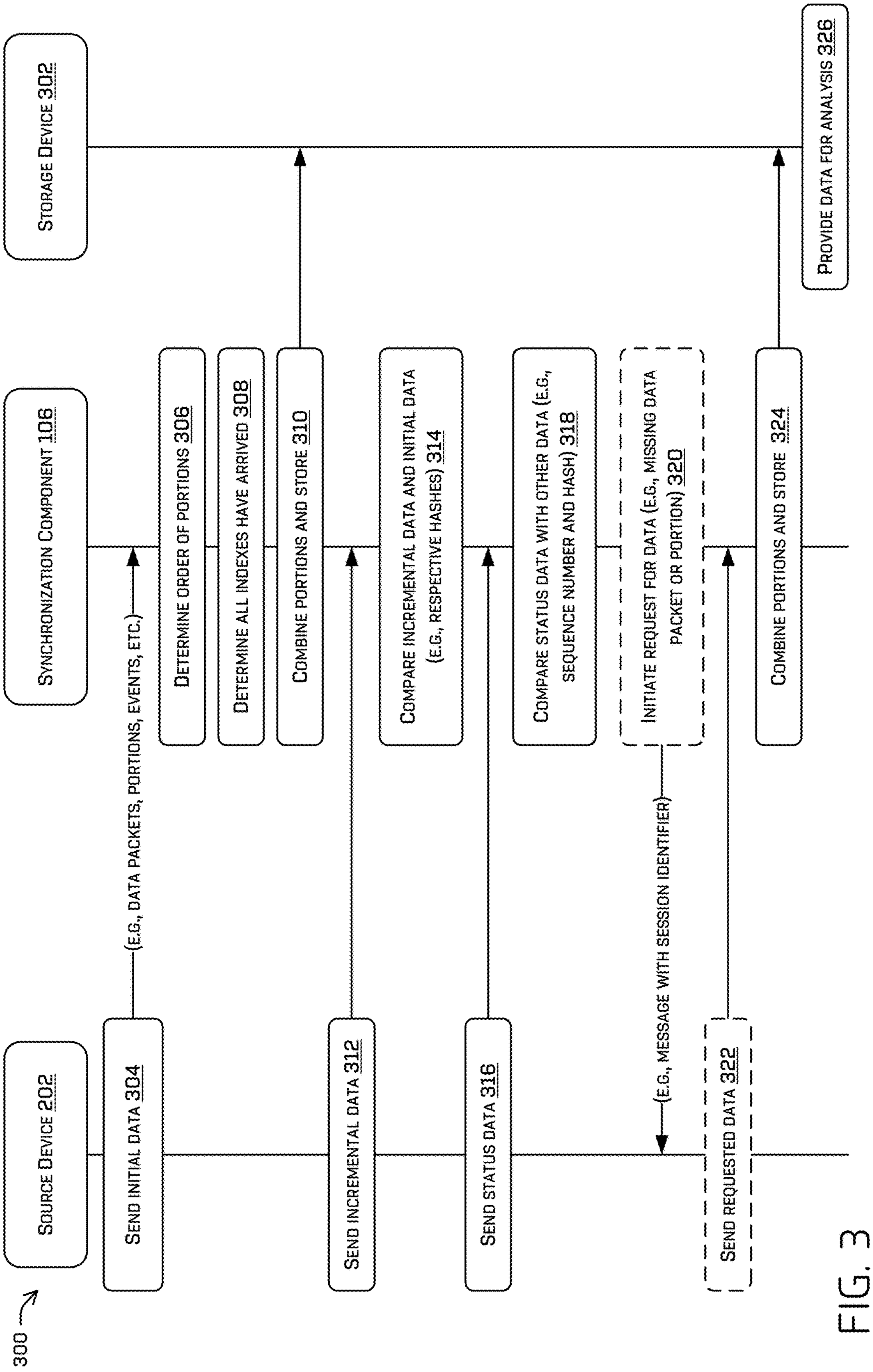
FIG. 3 is a pictorial diagram illustrating an example process for synchronizing data between a source device and a target device, as described herein.

FIG. 3 is a pictorial diagram illustrating an example process 300 for synchronizing data between a source device and a target device, as described herein. The example process 300 may be implemented by a computing device such as the computing device(s) 102 of FIG. 1 or the target device 204 of FIG. 2. The computing device can implement the aggregation component 104, the synchronization component 106, and/or the model(s) 108 to generate the output data 114. FIG. 3 further depicts a storage device 302. The storage device 302 can represent, for example, a registry, a memory, a database, or the like, such as the database 110 or the database 210. In some examples, the process 300 can be performed by the target device 204 and the storage device 302 can be the database 210.

An operation 304 can include the source device 202 sending initial data to the synchronization component 106. For example, the synchronization component 106 can receive input data representing data packets, portions, events, etc. associated with a data file. In some examples, the initial data can include the portions 212 of FIG. 2 associated with a JSON file for synchronizing to the database 210. In various examples, the initial data can represent serialized JSON data for transmitting over a network (e.g., the network(s) 120).

In various examples, the synchronization component 106 can cause the source device to determine information describing different portions of the initial data. For instance, the synchronization component 106 can send computer-readable instructions to a data component of the source device 202 to cause the source device 202 to assign a sequence number, hash value, index values, payload information, source identifier, and so on to various portions of data for sending to the synchronization component 106.

Data sent from the source device 202 as part of the operation 304 can be stored in the database 208 for a threshold amount of time for access at a later time. Data may be lost during transmission due to a network problem or other issue, and the database 208 can store data for resending to the synchronization component 106. For example, portions that were not be received by the synchronization component 106 can be accessed until expiration of the threshold amount of time when data stored in the database 208 may be replaced with new data or otherwise deleted.

An operation 306 can include the synchronization component 106 determining an order for the portions received as the initial data based on the respective information associated with two or more of the portions. For example, the synchronization component 106 can arrange the portions in order based on comparing the respective sequence numbers, index numbers, or the like. The operation 306 can include, for example, arranging the first portion 212A, the second portion 212B, and the portion 214 based on the sequence number and/or index number associated with each respective portion.

An operation 308 can include the synchronization component 106 determining that the expected number the index values for respective sequences have been received. For example, the synchronization component 106 can compare the index values of portions received over time to a total number of indexes associated with a particular sequence and/or hash value. In examples when at least one index values is needed to meet the total number of indexes (e.g., index 1 of 3 and index 2 of 3 arrived and index 3 of 3 did not), the synchronization component 106 can wait for a threshold amount of time for an incremental update to send one or more additional portions and detecting whether the additional portions includes an expected index (e.g., index 3 of 3). If after the threshold amount of time additional portions are not received, the synchronization component 106 can initiate a request for a portion having a particular index value, for example.

In various examples, the synchronization component 106 can receive portions as part of a synchronous transmission and/or an asynchronous transmission, and use the index values to determine an order of the portions and/or whether all the expected portions have been received.

An operation 310 can include the synchronization component 106 combining portions and storing the combined portions in the storage device 302. For example, responsive to determining that the index values meet the total number of indexes (e.g., index 1 of 3, index 2 of 3, and index 3 of 3 arrived), the synchronization component 106 can combine the portions (e.g., and payloads associated with therewith) and store that the combined portions in the storage device 302.

An operation 312 can include the source device 202 sending incremental data to the synchronization component 106. For example, the source device 202 can transmit the incremental data 218 comprising the portion 214 to the synchronization component 106. In various examples, the incremental data can represent updates to the data file after receiving the initial data and can represent additional portions of data received over a time period. In some examples, multiple iterations of incremental data can be received in addition to the incremental data sent as part of operation 312.

In various examples, the incremental data may be sent responsive to the source device 202 detecting a change in activity associated with the data file. The data file can represent events stored in memory of the source device 202 and/or events executed by a processor of the source device 202. In some examples, a security agent can detect changes in activity associated with the memory and/or the processor, and store the changes in a data file for security analysis. In some examples, the source device 202 can implement a security agent or data component to send the data file to the synchronization component 106 as incremental data over a time period.

An operation 314 can include the synchronization component 106 comparing the incremental data and the initial data. For example, the synchronization component 106 can compare information of respective portions associated with the incremental data one to another to determine whether the incremental data includes missing or extraneous portions. The component the synchronization component 106 can, also or instead compare information (e.g., hash values, sequence numbers, index values, or other information) associated with respective portion of the incremental data to corresponding information associated with the initial data. Based on the comparison(s), the synchronization component 106 can determine whether to store the incremental data (e.g., all portions of data have been received based on comparing index values), arrange the portions in a sequence, identify a missing portion, just to name a few.

An operation 316 can include the source device 202 sending status data 222 to the synchronization component 106. The status data 220 can provide an indication of a current state of the source device 202 such as by providing the source state 216 of the source device 202 at a particular time. In some examples, the status data 220 may be sent periodically (e.g., a pre-determined interval in minutes, an hour, or other interval) and/or responsive to a request from the target device 204 (e.g., a portion has not been received within an expected time frame). The status data 220 may indicate information associated with the most recently sent portion. For example, the incremental data can be associated with a first hash value and the status data can include a second hash value.

An operation 318 can include the synchronization component 106 comparing the status data with other data. The synchronization component 106 can, for example, compare a sequence number and/or a hash value associated with the status data to a corresponding sequence number and/or a corresponding hash value associated with one or more portions of the incremental data.

An operation 320 can include the synchronization component 106 initiating a request from the source device 202. For example, the synchronization component 106 can generate a request identifier (also referred to as a cloud identifier) usable for recognizing data returned from the source device 202 as part of the request. By way of example and not limitation, the request for transmitting to the source device 202 can indicate information (one or more of: an index number, a sequence number, a hash value, a source identifier, a session identifier, etc.) to identify a portion from the database 208 to replace a missing portion. For example, by receiving status data at periodic intervals, the synchronization component 106 can determine that the source device 202 is operating as expected (e.g., the first and second hash values match and letting synchronization commence) or determine that the source device 202 failed to send at least some portions (e.g., due to the first and second hash values not matching).

At operation 322, the source device 202 can send the requested data to the synchronization component 106. The operations 320 and 322 are shown in FIG. 3 with dashed lines to indicate the operations may be omitted in examples when all data associated with the data file is transmitted to the synchronization component 106 free of errors (e.g., all index values received, all sequence numbers received, and so on).

An operation 324 can include the synchronization component 106 combining portions storing the combined portions in the storage device 302. For example, responsive to one or more of: the comparing at operation 314, the comparing at operation 318, and/or receiving the requested data, portions associated with the incremental data and/or the requested data can be combined with the initial data in the storage device 302 (e.g., as synchronized data).

An operation 326 can include the storage device 302 providing data for analysis to a model, component, service, device, or the like. For example, a security service can access the stored data (e.g., synchronized data) for determining presence of potential malicious activity in the combined payload representing the data file stored in the database 208 of the source device 202. In some examples, combined portions representing synchronized data may be output to a model, component, or service independent of being stored in the storage device 302. In various examples, the computing device(s) 102 can receive the first data associated with previous activity in a data stream of a host device (e.g., a potentially malicious process or thread, an instruction to write data to a memory, file, or the like).

Figure 4:
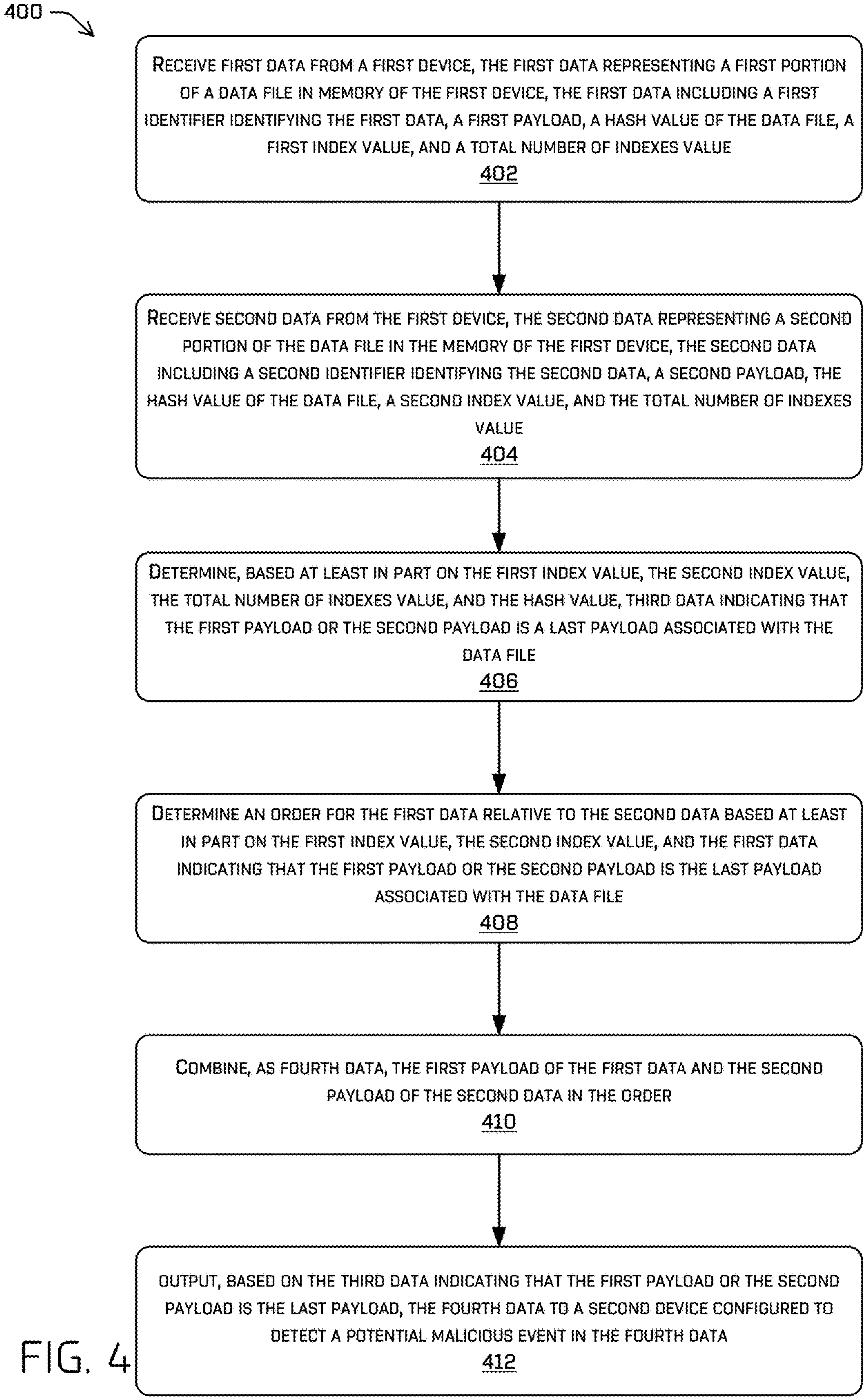
FIG. 4 is a flowchart depicting an example process for combining portions of a data file, as described herein.

FIG. 4 is a flowchart depicting an example process 400 for combining portions of a data file, as described herein. Some or all of the process 400 may be performed by one or more components in FIG. 1 as described herein. For example, some or all of process 400 may be performed by the computing device(s) 102 (or service associated therewith).

At operation 402, the process can include receiving first data from a first device. In various examples, the first data can represent a first portion of a data file in memory of the first device and may include one or more of: a first identifier identifying the first data, a first payload, a hash value of the data file, a first index value, and a total number of indexes value, just to name a few. In some examples, the operation 402 can include the computing device(s) 102 receiving the input data 112 from the host device(s) 118. By way of example and not limitation, the host device can transmit portions of a JSON data file using a schema as defined herein including defining information for the portions and each respective portion can represent a data packet, data string, byte array, or another data structure for analysis.

At operation 404, the process can include receiving second data from the first device. In some examples, the second data can represent a second portion of the data file in the memory of the first device and may include one or more of: a second identifier identifying the second data, a second payload, the hash value of the data file, a second index value, and the total number of indexes value. For example, the computing device(s) 102 can receive the input data 112 from the host device(s) 118 at a same time as the first data or subsequent to receiving the first data. In various examples, the first identifier or the second identifier can represent a random value determined by a random number generator.

At operation 406, the process can include determining, based at least in part on the first index value, the second index value, the total number of indexes value, and the hash value, third data indicating that the first payload or the second payload is a last payload associated with the data file. For instance, the synchronization component 106 the compare the first data with the second data and output an indication that all the expected index values and associated portions of been received.

At operation 408, the process can include determining an order for the first data relative to the second data based at least in part on the first index value and the second index value. In some examples, the order may be further determined based on the first data indicating that the first payload or the second payload is the last payload associated with the data file. For instance, the computing device(s) 102 can implement the synchronization component 106 to determine a sequence of the first portion relative to the second portion using an order of the respective index values.

At operation 410, the process can include combining, as fourth data, the first payload of the first data and the second payload of the second data in the order. For instance, the computing device(s) 102 can implement the synchronization component 106 to concatenate, position, arrange, or otherwise combine the first portion and the second portion as synchronized data (e.g., based on the determined order an indication that all portions for a particular data file have been received). In some examples, the combining of first payload of the first data and the second payload of the second data may be based at least in part on the first data and the second data including a same hash value (e.g., indicating the payloads are for a same data file). At operation 412, the process can include outputting, based on the third data indicating that the first payload or the second payload is the last payload, the fourth data to a second device configured to detect a potential malicious event in the fourth data. For instance, the synchronization component 106 can transmit the combined, or synchronized data, to a cloud computing device configured to detect potential malicious event (e.g., a security threat by a threat actor) in the first payload and/or the second payload. In some examples, potential security threats can be transmitted to the first device for analysis, validation, or the like. By determining information specific for different portions of a data file as described herein, portions of a data file can be combined in less time and with more accuracy versus not implementing such techniques.

Figure 5:
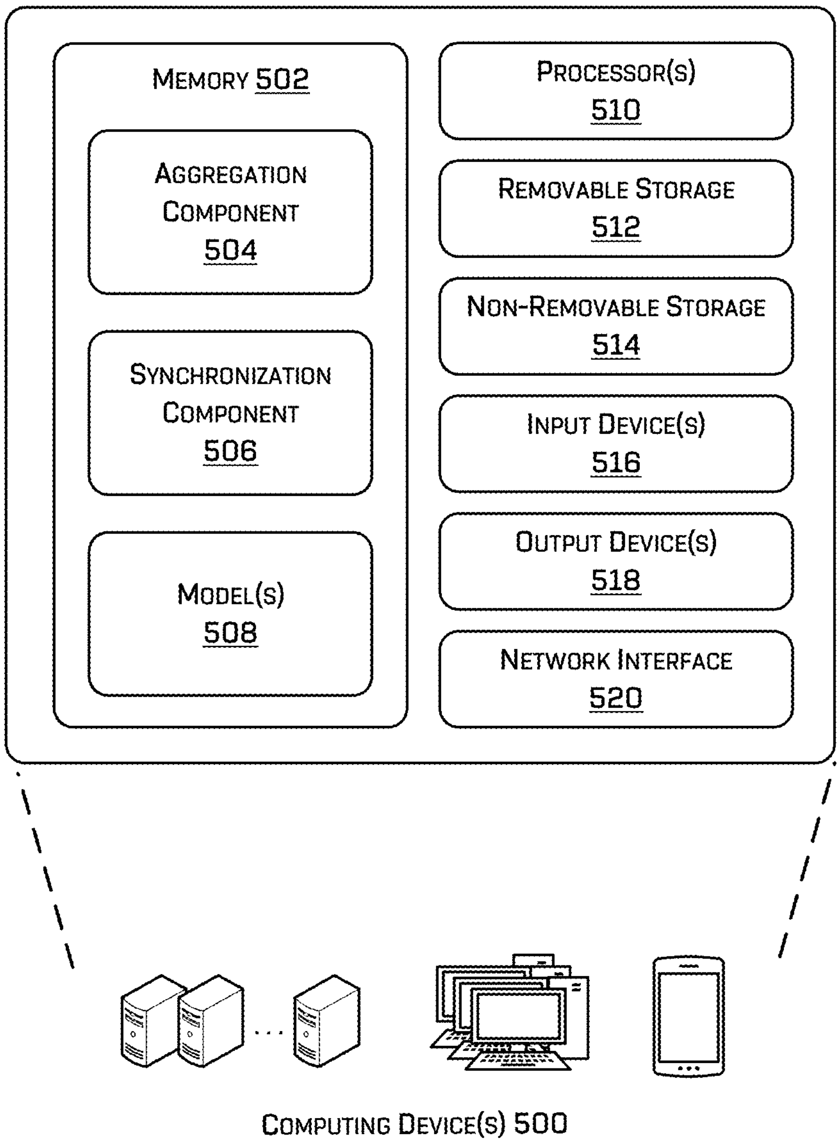
FIG. 5 is a block diagram of an illustrative computing architecture to implement the techniques describe herein.

FIG. 5 is a block diagram of an illustrative computing architecture of the computing device(s) 500 to implement the techniques describe herein. In some embodiments, the computing device(s) 500 can correspond to the host device(s) 118 or the computing device(s) 102 of FIG. 1. It is to be understood in the context of this disclosure that the computing device(s) 500 can be implemented as a single device or as a plurality of devices with components and data distributed among them. By way of example, and without limitation, the computing device(s) 500 can be implemented as various computing device 500(1), 500(2), . . . , 500(N) where N is an integer greater than 1.

As illustrated, the computing device(s) 500 comprises a memory 502 storing an aggregation component 504, a synchronization component 506, and model(s) 508. Also, the computing device(s) 500 includes processor(s) 510, a removable storage 512 and non-removable storage 514, input device(s) 516, output device(s) 518, and network interface 520.

In various embodiments, memory 502 is volatile (such as RAM), non-volatile (such as ROM, flash memory, etc.) or some combination of the two. The aggregation component 504, the synchronization component 506, and the model(s) 508 stored in the memory 502 can comprise methods, threads, processes, applications or any other sort of executable instructions. The aggregation component 504, the synchronization component 506, and the model(s) 508 can also include files and databases.

In various embodiments, the memory 502 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The memory 502 may also be described as computer storage media or non-transitory computer-readable media, and may include volatile and nonvolatile, removable and non-removable media implemented in any method or technology for storage of information, such as computer readable instructions, data structures, program modules, or other data. Computer-readable storage media (or non-transitory computer-readable media) include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, and the like, which can be used to store the identified information and which can be accessed by the security service system. Any such memory 502 may be part of the security service system.

The aggregation component 504 may receive and store any client entity information and their associated security information including observed activity patterns received from the data component(s) 124 on the respective host device(s) 118. The aggregation component 504 may gather data from other modules that may be stored in a data store. In some embodiments, the aggregation component 504 may gather and store data associated with known information, such as domain information that is associated with known entities, for access as input data by the synchronization component 506 (or other component).

In some examples, the aggregation component 504 can correspond to, or otherwise include the functionality of, the aggregation component 104 of FIG. 1.

In some instances, the synchronization component 506 can correspond to, or otherwise include the functionality of, the synchronization component 106 of FIG. 1.

In some instances, the model(s) 508 can correspond to, or otherwise include the functionality of, the model(s) 108 of FIG. 1.

In some instances, any or all of the devices and/or components of the computing device(s) 500 may have features or functionality in addition to those that FIG. 5 illustrates. For example, some or all of the functionality described as residing within any or all of the computing device(s) 500 may reside remotely from that/those computing device(s) 500, in some implementations.

The computing device(s) 500 may be configured to communicate over a telecommunications network using any common wireless and/or wired network access technology. Moreover, the computing device(s) 500 may be configured to run any compatible device operating system (OS), including but not limited to, Microsoft Windows Mobile, Google Android, Apple iOS, Linux Mobile, as well as any other common mobile device OS.

The computing device(s) 500 also can include input device(s) 516, such as a keypad, a cursor control, a touch-sensitive display, voice input device, etc., and output device(s) 518 such as a display, speakers, printers, etc. These devices are well known in the art and need not be discussed at length here.

As illustrated in FIG. 5, the computing device(s) 500 also includes the network interface 520 that enables the computing device(s) 500 of the security service system to communicate with other computing devices, such as any or all of the host device(s) 118, or the source device 202.

FIGS. 3 and 4 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. For instance, the example process of FIG. 3 may omit operations 316, 320, 322, and/or 326. In some examples, the example process of FIG. 4 may omit operation 412. In various examples, the operation 316 (e.g., send status data) can occur before, during, or after another operation such as the operation 312 (e.g., send incremental data).

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed processes could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing computer-executable instructions that, when executed, cause the one or more processors to perform operations comprising:

receiving, from a host device, a first data packet associated with a data file, the first data packet comprising a first identifier to identify the first data packet, a first payload, a first index value, and a total number of indexes associated with the data file;

receiving, from the host device, a second data packet associated with the data file, the second data packet comprising a second identifier to identify the second data packet, a second payload, a second index value, and the total number of indexes associated with the data file;

determining, based on the first index value, the second index value, and the total number of indexes associated with the data file, first data indicating that the first payload or the second payload is a last payload associated with the data file;

determining an order for the first data packet relative to the second data packet based on the first index value, the second index value, and the first data indicating that the first payload or the second payload is the last payload associated with the data file;

combining, as second data, the first payload of the first data packet and the second payload of the second data packet in the order; and storing, based on the first data indicating that the first payload or the second payload is the last payload, the second data in a storage device for access by a computing device configured to detect a potential malicious event in the second data.

2. The system of claim 1, the operations further comprising:

determining that a third data packet associated with a third index value has not been received based on the first index value, the second index value, and the total number of indexes; and initiating a message for sending to the host device that includes a request for the third data packet using the third index value.

3. The system of claim 1, the operations further comprising:

determining that a third data packet associated with the data file is out of sequence relative to the first data packet or the second data packet based on the first index value, the second index value, and the total number of indexes; and arranging the first data packet, the second data packet, and the third data packet in sequential order based at least in part on the first index value, the second index value, and a third index value associated with the third data packet.

4. The system of claim 1, wherein the second data packet is received at a first time and further includes a hash value associated with a hash of the data file, and the operations further comprising:

receiving a third data packet associated with the data file from the host device at a second time after the first time;

determining that the hash value is included in the third data packet; and determining, based at least in part on determining that the hash value is included in the third data packet, whether to request a fourth data packet associated with the data file from the host device.

5. The system of claim 1, wherein the second data packet is received at a first time, the first data includes a first hash value, and the data file is a first data file, and the operations further comprising:

receiving a third data packet from the host device at a second time after the first time;

determining that the third data packet includes a second hash value different from the first hash value; and storing, based at least in part on determining that the second hash value is different from the first hash value, an indication that the third data packet is associated with a second data file different form the first data file.

6. One or more non-transitory computer-readable media storing instructions executable by one or more processors, wherein the instructions, when executed, cause the one or more processors to perform operations comprising:

receiving first data from a first device, the first data representing a first portion of a data file in memory of the first device, the first data including a first identifier identifying the first data, a first payload, a first index value, and a total number of indexes value;

receiving second data from the first device, the second data representing a second portion of the data file in the memory of the first device, the second data including a second identifier identifying the second data, a second payload, a second index value, and the total number of indexes value;

determining, based at least in part on the first index value, the second index value, and the total number of indexes value, third data indicating that the first payload or the second payload is a last payload associated with the data file;

determining an order for the first data relative to the second data based at least in part on the first index value and the second index value;

combining, as fourth data, the first payload of the first data and the second payload of the second data in the order; and outputting, based on the third data indicating that the first payload or the second payload is the last payload, the fourth data to a second device configured to detect a potential malicious event in the fourth data.

7. The one or more non-transitory computer-readable media of claim 6, wherein:

the first data represents a first data packet and further includes a hash value of the data file, the second data represents a second data packet and further includes the hash value of the data file, the first device is host device in a first environment, the second device is a cloud computing device in a second environment, and determining the third data is based at least in part on the hash value being included in the first data and the second data.

8. The one or more non-transitory computer-readable media of claim 6, the operations further comprising:

determining that the third data associated with a third index value has not been received based on the first index value, the second index value, and the total number of indexes value; and initiating a message for sending to the first device that includes a request for the third data using the third index value.

9. The one or more non-transitory computer-readable media of claim 8, the operations further comprising:

detecting a device identifier associated with the first device in the first data or the second data; and sending the message to the first device based at least in part on detecting the device identifier.

10. The one or more non-transitory computer-readable media of claim 6, the operations further comprising:

determining that the third data associated with the data file is out of sequence relative to the first data or the second data based on the first index value, the second index value, and the total number of indexes value; and determining a sequence including the first data, the second data, and the third data based at least in part on the first index value and the second index value.

11. The one or more non-transitory computer-readable media of claim 6, wherein the second data is received at a first time and further includes a hash value associated with the data file, and the operations further comprising:

receiving the third data associated with the data file from the first device at a second time after the first time;

determining that the hash value is included in the third data;

determining that a third payload is absent from the third data; and determining, based at least in part on determining that the hash value is included in the third data, a state of the first device at the second time.

12. The one or more non-transitory computer-readable media of claim 6, the first identifier or the second identifier represents a random value determined by a random number generator, the data file represents a first JavaScript object notation (JSON) file, and the operations further comprising:

deserializing the second data, and outputting the fourth data based at least in part on deserializing the second data.

13. The one or more non-transitory computer-readable media of claim 6, the operations further comprising:

transmitting the fourth data to a security service in a cloud computing environment; and causing the security service to detect the potential malicious event in the fourth data and output the potential malicious event to the first device.

14. The one or more non-transitory computer-readable media of claim 6, the operations further comprising:

determining that the data file includes the third data;

determining a session identifier included in the first portion and the second portion of the data file; and configuring a message for sending to the first device requesting the third data, the message including an identifier of the first device, the session identifier, a hash value representing the data file, and a third index value of the third data.

15. The one or more non-transitory computer-readable media of claim 6, the operations further comprising:

determining that the first data and the second data include a hash value associated with applying a hash algorithm to the data file, and combining the first payload of the first data and the second payload of the second data is based at least in part on determining that the first data and the second data include the hash value.

16. The one or more non-transitory computer-readable media of claim 6, the operations further comprising:

one of:

sending a first message to the first device indicating an action to mitigate the potential malicious event; or sending a second message to the first device indicating that the fourth data is valid for execution by a processor of the first device.

17. A computer-implemented method comprising:

receiving first data from a first device, the first data representing a first portion of a data file in memory of the first device, the first data including a first identifier identifying the first data, a first payload, a first index value, and a total number of indexes value;

receiving second data from the first device, the second data representing a second portion of the data file in the memory of the first device, the second data including a second identifier identifying the second data, a second payload, a second index value, and the total number of indexes value;

determining, based at least in part on the first index value, the second index value, and the total number of indexes value, third data indicating that the first payload or the second payload is a last payload associated with the data file;

determining an order for the first data relative to the second data based at least in part on the first index value and the second index value;

combining, as fourth data, the first payload of the first data and the second payload of the second data in the order; and outputting, based on the third data indicating that the first payload or the second payload is the last payload, the fourth data to a second device configured to detect a potential malicious event in the fourth data.

18. The computer-implemented method of claim 17, further comprising:

determining that the third data associated with a third index value has not been received based on the first index value, the second index value, and the total number of indexes value; and initiating a message for sending to the first device that includes a request for the third data using the third index value.

19. The computer-implemented method of claim 17, further comprising:

determining that the third data associated with the data file is out of sequence relative to the first data or the second data based on the first index value, the second index value, and the total number of indexes value; and determining a sequence including the first data, the second data, and the third data based at least in part on the first index value and the second index value.

20. The computer-implemented method of claim 17, wherein the second data is received at a first time and further includes a hash value associated with the data file, and further comprising:

receiving third data associated with the data file from the first device at a second time after the first time;

determining that the hash value is included in the third data;

determining that a third payload is absent from the third data; and determining, based at least in part on determining that the hash value is included in the third data, a state of the first device at the second time.

* * * * *